United States Patent
Kraatz

(10) Patent No.: US 7,540,111 B2
(45) Date of Patent: Jun. 2, 2009

(54) INSECT BAIT STAKE

(75) Inventor: Thomas D. Kraatz, Glendale, MO (US)

(73) Assignee: Senoret Chemical Company Mo. Corp., St. Louis, MO (US)

( * ) Notice: Subject to any disclaimer, the term of this patent is extended or adjusted under 35 U.S.C. 154(b) by 662 days.

(21) Appl. No.: 10/858,325

(22) Filed: Jun. 1, 2004

(65) Prior Publication Data

US 2005/0000148 A1    Jan. 6, 2005

Related U.S. Application Data

(60) Provisional application No. 60/475,345, filed on Jun. 4, 2003.

(51) Int. Cl.
*A01M 1/20* (2006.01)
(52) U.S. Cl. .................. 43/132.1; 43/131
(58) Field of Classification Search .............. 43/131, 43/132.1, 124; 47/48.5; 206/469
See application file for complete search history.

(56) References Cited

U.S. PATENT DOCUMENTS

| | | | | |
|---|---|---|---|---|
| 2,547,314 A | * | 4/1951 | Grant | 43/131 |
| 2,825,996 A | * | 3/1958 | Grant | 43/131 |
| 2,893,160 A | * | 7/1959 | Grant | 43/131 |
| 3,828,464 A | * | 8/1974 | Peace | 43/131 |
| 4,065,872 A | * | 1/1978 | Patton et al. | 43/131 |
| 5,379,545 A | * | 1/1995 | Gall et al. | 43/131 |
| 5,528,854 A | * | 6/1996 | Antonali et al. | 43/131 |
| D400,635 S | * | 11/1998 | Kinzler et al. | D22/122 |
| 5,870,853 A | * | 2/1999 | Williams | 43/131 |
| 6,016,625 A | * | 1/2000 | Bishoff et al. | 43/121 |
| 6,085,942 A | * | 7/2000 | Redmond | 222/107 |
| 6,233,861 B1 | * | 5/2001 | DelVecchio | 43/1 |

* cited by examiner

Primary Examiner—T. Nguyen
(74) Attorney, Agent, or Firm—Paul M. Denk

(57) ABSTRACT

An ant or other insect bait stake, including a stake portion, formed having reinforcement aspects, including integrally formed corrugations, and having molded therewith a reservoir portion within which a liquid or paste like insecticide or bait may be located, such that when the reservoir is opened, and the ants obtain access thereto, the insecticide may be consumed for eradication of such pests. The reservoir may be of stepped configuration, so as to provide landings for locating of the insects, as they climb down to the insecticide, located internally of the reservoir, during usage of the bait stake.

4 Claims, 2 Drawing Sheets

INSECT BAIT STAKE

CROSS REFERENCE TO RELATED APPLICATION

This nonprovisional patent application claims priority to the provisional patent application having Ser. No. 60/,475,345, which was filed on Jun. 4, 2003.

BACKGROUND OF THE INVENTION

Initially, numerous types of bait stations have been developed for attracting and killing of insects, through provision of a supply of bait, normally one that is doped with an insecticide, and facilitating the application of the station at a location where it will attract and kill insects through ingestion of the edible bait. More specifically, various types of bait stations, of the type as identified, have been available for some time for attracting roaches, ants, and other type of pests.

For example, the prior patent to Antonali, et al., U.S. Pat. No. 5,528,854, shows a plastic insect bait assembly. As one can see, the assembly includes an elongated support body, it has a monolithically formed reservoir, incorporating a peripheral wall, and a reinforcing portion, that forms the reservoir for holding the insect bait. Then, a reservoir cover incorporates positioning tabs furnished for locking of the tabs onto the previous reservoir, when the assembly is completed, after an insecticide has been located within the formed reservoir.

From a review of the prior art device, it is quite apparent that such an assembly has been designed for providing for re-usage and refilling of the bait assembly, as shown.

The current invention provides a bait stake that can be integrally molded, or molded of half components, filled with the bait, probably a liquid bait, and sealed, retaining the bait in place until such time as it is accessible after installation at the location where insects have a known presence.

SUMMARY OF THE INVENTION

This invention contemplates the molding of an insect or ant bait stake that can be formed of a polymer, molded into an integral or semi-integral structure, filled with the liquid or other bait, sealed, and in such condition, can easily be stored, shipped, displayed for marketing, and will not expose any of its insecticide until such time as it is installed, reopened for attracting preferably ants thereto and therein, for consumption of the contained insecticide.

This invention includes an integrally molded stake like component, which may be corrugated in structure, so as to add reinforcement to the device, and which allows for it easily being embedded into the ground, at the situs of usage. The bottom end of the stake may be inclined, or pointed, in order to facilitate its application into the ground.

Preferably, the stake may be made of two halves, each half being injection molded, or blow molded, into its usable configuration, and then the halves, which normally will comprise a mirror image of each other, can be adhered either by an adhesive, heat sealing, or sonic welding, together, to form an integrally formed upper reservoir upon the stake, readily available for marketing and usage by the homeowner, business owner, professional pest controller, or the like. Obviously, the stake can be most useful for the professional pest controller, when treating a facility.

Generally, the two halves of the molded stake will be somewhat of a mirror image, so that when the entire stake is filled with the insecticide, and assembled, as previously reviewed, it will have symmetry on both sides of its structure, and which will be molded into a structure that can absorb some force and pressure, particularly when applied from the top, as when the stake is being partially driven into the ground, in preparation for usage. Part of the stake may extend above the configured reservoir, and in that position, can withstand light impacts from a hammer, or other instruments, to aid in the installation of the stake into the ground for usage.

In addition, an upper location of the stake, or its reservoir, may be provided with an aperture, that leads into the interior of the reservoir, and when opened, as by cutting with a scissors, knife, or the like, provides an access opening for the insects, such as ants, into the interior of the formed stake, or particularly its insecticide laden reservoir, to allow the ants to consume the same, and normally, as known, convey a part of the insecticide back to the nest, for consumption by other similar insects. For example, the access openings may be located at a corner of the stake, and can be cut free, to provide an opening into the interior of the reservoir. Or, the outer edge of one side of the reservoir may contain a cutting area, which when severed, provides and access opening into the complete reservoir. Or, a simple access opening maybe provided at the top of one or both halves of the formed reservoir, and when its closure sealant is pulled free, provides an access opening also into the interior of the reservoir, so that the ants can attain access into the same.

In any event, when the stake has been used for some time, and all of its insecticidal contents have been consumed or removed by insects, the stake can simply be thrown away, and replaced by a fresh insect or ant bait stake.

These are examples as to how the invention of this stake may be formed, in principle, in order to furnish a stake that generally has significant outdoor usage, near the residence, or the building, for eliminating the ants and insects that may be within the vicinity, and keep them from attaining access into the building, in search of the food source.

It is, therefore, the principal object of this invention to provide an insect or ant bait stake which can be molded into two parts, filled with an insecticide, sealed into closure, and readily marketable to the trade, without any spillage, or other inadvertent release of its contained insecticide.

Yet another object of this invention is to provide a molded polymer stake which is formed having reinforced structure so as to add sufficient strength to its embodiment to allow it to be pressed or hammered into the ground, in preparation for usage.

Yet another object of this invention is to provide a bait stake which has a conveniently located access opening into its interior, and particularly of its insecticide laden reservoir, so that the opening can be easily made when the stake has been installed, in preparation for its immediate usage.

Still another object of this invention is to provide a uniquely shaped ant stake that is configured having various levels, internally thereof, to function as a landing area for the ants as they move into and through the reservoir, to attain access to its insecticide.

These and other objects may become more apparent to those skilled in the art upon reviewing the summary of the invention herein, and upon undertaking a study of the description of its preferred embodiment, in view of the drawings.

BRIEF DESCRIPTION OF THE DRAWINGS

In referring to the drawings, FIG. 1 provides an isometric view of the insect and ant bait stake of this invention.

DESCRIPTION OF THE PREFERRED EMBODIMENT

Figure 1:
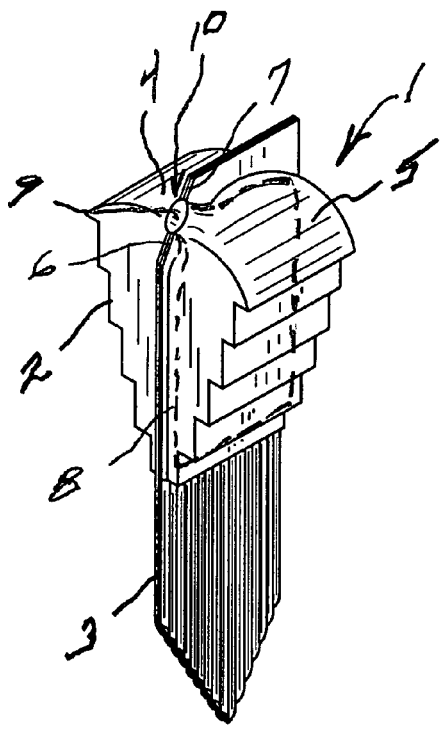
Figure 2:
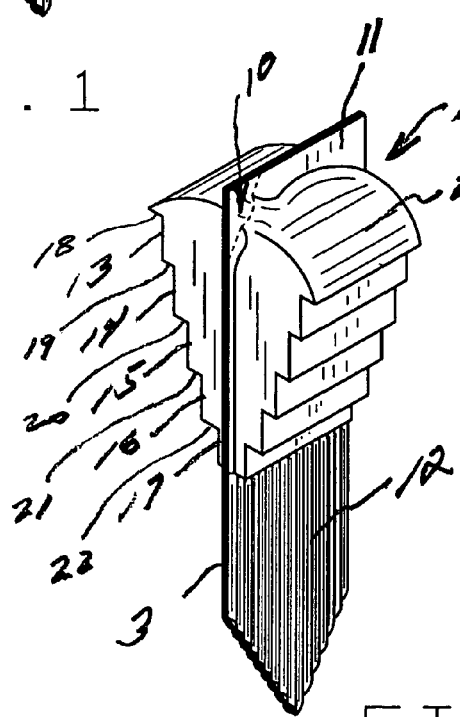
FIG. 2 provides an isometric view of the bait stake of FIG. 1, before it has been accessed opened.

In referring to the drawings, and in particular FIGS. 1 and 2, therein is shown the bait station 1 of this invention. The bait station includes a reservoir like container 2, which is adaptable for holding a supply of preferably a liquid bait, of the insecticide type, that can readily consumed by insects, such as ants, and either effect their demise, or provide for carry back of the insecticide to the ant den, or sharing with other ants in the colony. As can be noted, a stake 3 is formed at the proximate midpoint of the device, and functions for the following purposes.

Initially, the stake will preferably be molded in two halves, which are a mirror image of each other, each of the halves 4 and 5 having a stake segment, as can be noted at 6 and 7, with each half of the stake 6 and 7 having integral molded therewith, its reservoir half 4 and 5, respectively, as can be understood. And, the stake will be opened, between the reservoirs, as generally can be noted at the outline 8, so that the entire reservoir 2 can readily hold a supply of the liquid or otherwise bait, and be readily accessible by any insect passing through the opening 9, a convenient channel through which the insect may pass, upon being attracted to the insecticide contained therein, for consumption. As can further be seen in FIG. 1, the corner of the stake 3, as at 10, has been removed or cut, upon an incline, to provide for opening of the access channel 9, as seen.

As can also be seen in FIG. 2, that corner 10 remains intact, has not been severed or cut as of yet, and therefore, the access opening 9 remains closed, particularly during shipment, storage, display for marketing, or while stored at home, before usage is made of the insect bait stake.

As can also be seen from the structure of the bait stake of this invention, the stake portion 3 will extend slightly upwardly above the reservoir 2, as can be determined at 11, and therein provide a rather stable type of edge, at the upper segment of the stake, which allows for either a pressure forcing of the stake into the ground, or even a slight hammering thereon, to drive the stake, and its lower segment, into the ground, in preparation for usage. As can be noted, the stake may be molded into a corrugated shape, as can be seen at 12, to add to its reinforcement, and to allow it to be driven or impaled into the ground, without collapse.

As can also be seen, the upper reservoir 2 of the stake is tiered, as can be noted along the segments 13 and 17, and provides a series of landings, as at 18 through 22, furnishing a stair-step area for the ants to occupy, as they move down the interior of the stake, and particularly to its reservoir, to attain access to the liquid or solid insecticide that may be contained therein.

Figure 3:
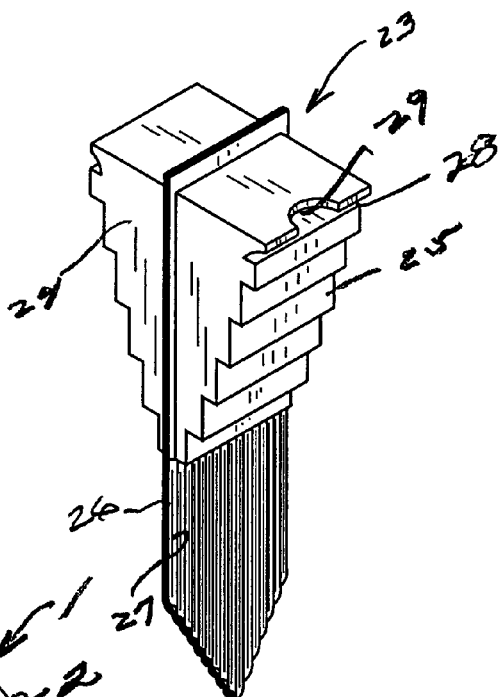
FIG. 3 shows an isometric view of a modification to the bait stake of this invention.

As can be seen in FIG. 3, the modified form of the bait stake 23 is noted. It also includes the reservoir halves 24 and 25, integrally formed and respectively with the laminated layers of the formed stake 26 and 27, when the halves of the stake are injection molded, and then sealed together to form the bait stake structure, as previously reviewed. In this instance, the upper edges, or at least one of the edges, as at 28, is provided with a more narrowed edge, that can be readily cut, as noted at 29, for allowing access into the insecticide laden reservoir, to allow and provide a supply of such for any ants or other insects that attain access into the bait stake.

Figure 4:
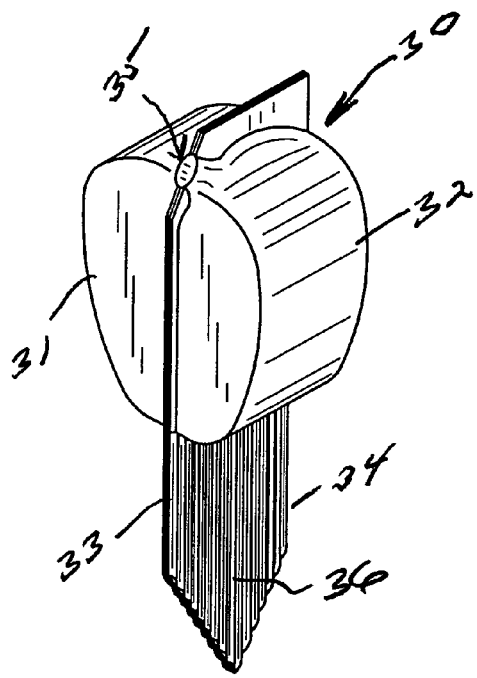
FIG. 4 shows an isometric view of a further modified bait stake of this invention.

FIG. 4 discloses a further modification to the bait stake 30 of this invention. Once again, it is formed of a pair of reservoir halves 31 and 32, or may be integrally blow molded with their laminated stake portions 33 and 34, and an access opening provided at its upper end, as at 35, which can be cut upon an incline, similar to the edge 10 of FIG. 1, for allowing the ants to obtain access into the interior of the shown reservoir, which would have been pre-filled with a liquid or otherwise insecticide or bait. Once again, the stake may be laminated, or corrugated, in the manner as shown at 36, to add to its reinforcement.

Figure 5:
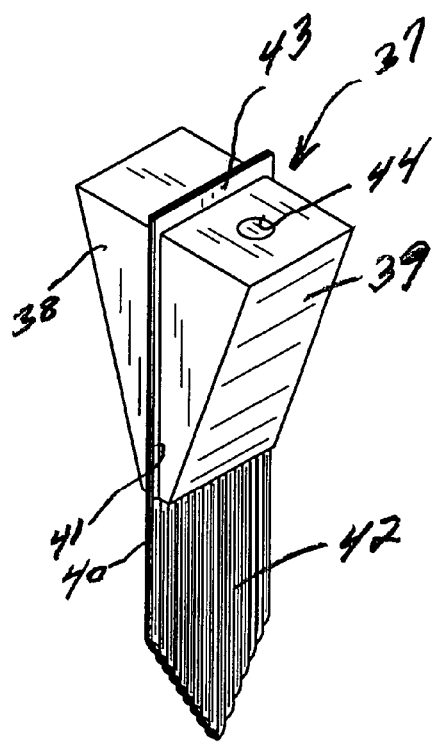
FIG. 5 shows yet another modified isometric view of the bait stake of this invention.

FIG. 5 shows another variation upon the bait stake of this invention. As noted, the bait stake 37 will additionally be formed of semi-halves or a pair of sides of the reservoir, as can be seen at 38 and 39, each of which that will be integrally molded with their stake portion 40 and 41, respectively, and then sealed together, either by an adhesive, heat seal, sonic welded, or by other means of adhesion, to form an integral stake structure, as noted. The stake, itself, once again, may be corrugated in its molding, as at 42, to add to its reinforcement. The upper end of the stake, as at 43, may extend slightly above the reservoir, as noted, and therein provide a surface that can be impacted, as by a hammer, or other forceful object, for impaling the lower stake portion 42 into the ground. In this particular instance, the reservoir half 39 will include an aperture, as at 44, and be sealed by an adhesive tab, or other means of closure, once the liquid or other bait is located within the reservoir, so that the station will be leak proof, as it is being manufactured, stored, shipped, marketed, or temporarily packed away by the homeowner, until such time the bait station is applied for usage.

Figure 6:
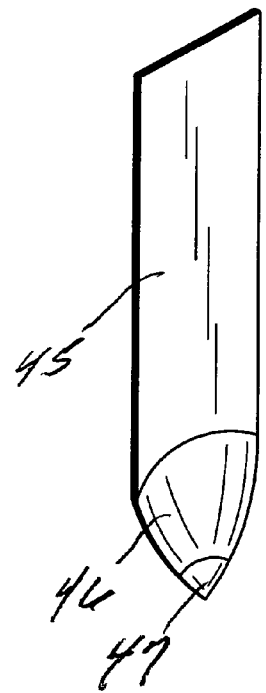
FIG. 6 discloses the centrally arranged stake, that may be used in conjunction with the bait insecticide reservoirs of this invention.

Finally, as can be seen in FIG. 6, the various styles of stake portions, as at 45, to be used and embodied within the structure of the bait stake of this invention as shown. This may include lower beveled edges, as at 46 and 47, to facilitate the insertion of the stake into the ground, when the member 45 is embodied within and integrally formed with a reservoir portion, of the types as previously described.

Variations or modifications to the subject matter of this invention may occur to those skilled in the art upon review of the development as described herein. Such variations, if within the spirit of this development, are intended to be encompassed within the scope of the invention, as described. The disclosure of the invention in the drawings, and as described in the preferred embodiment, are set forth for illustrative purposes only.

The invention claimed is:

1. An insect bait stake comprising a reservoir, an elongated stake portion extending downwardly from said reservoir, said reservoir having a cuttable opening therein and into which insecticide is inserted, and whereby said bait stake may be impaled within the ground and the cuttable opening is removed to allow access of insects to the insecticide during usage, said reservoir and said stake portion are integrally formed, and each of said reservoir and said state portion comprise one half of said insect bait stake, where the two halves of said insect bait stake are adhered together to form said bait stake for impaling within the ground, each of said stake portions extending outwardly of each of said reservoirs, and have a flat surface thereon, so as to adhere together to form said bait stake, an upper segment of each of said stake portions extending upwardly above the reservoir, and thereby provide a stable edge allowing for pressure to be applied thereon for forcing of the bait stake into the ground, the stake portion extending downwardly from said reservoir having a corrugated shape to add to its reinforcement, and an upper corner of said upper segment being severed to provide an opening into said filled reservoir bait stake, and said reservoir incorporated a series of internal landings to furnish a stair-step area for the ants to occupy as they move down the interior of said filled reservoir bait stake to attain access to the insecticide contained therein.

2. The insect bait stake of claim 1 wherein the upper surface of the reservoir portion is curved.

3. The insect bait stake of claim 1 wherein the upper surface of the reservoir is flat.

4. The insect bait stake of claim 1 wherein the reservoir is triangular of configuration, and the upper surface of the reservoir is flat.

\* \* \* \* \*